UNITED STATES PATENT OFFICE.

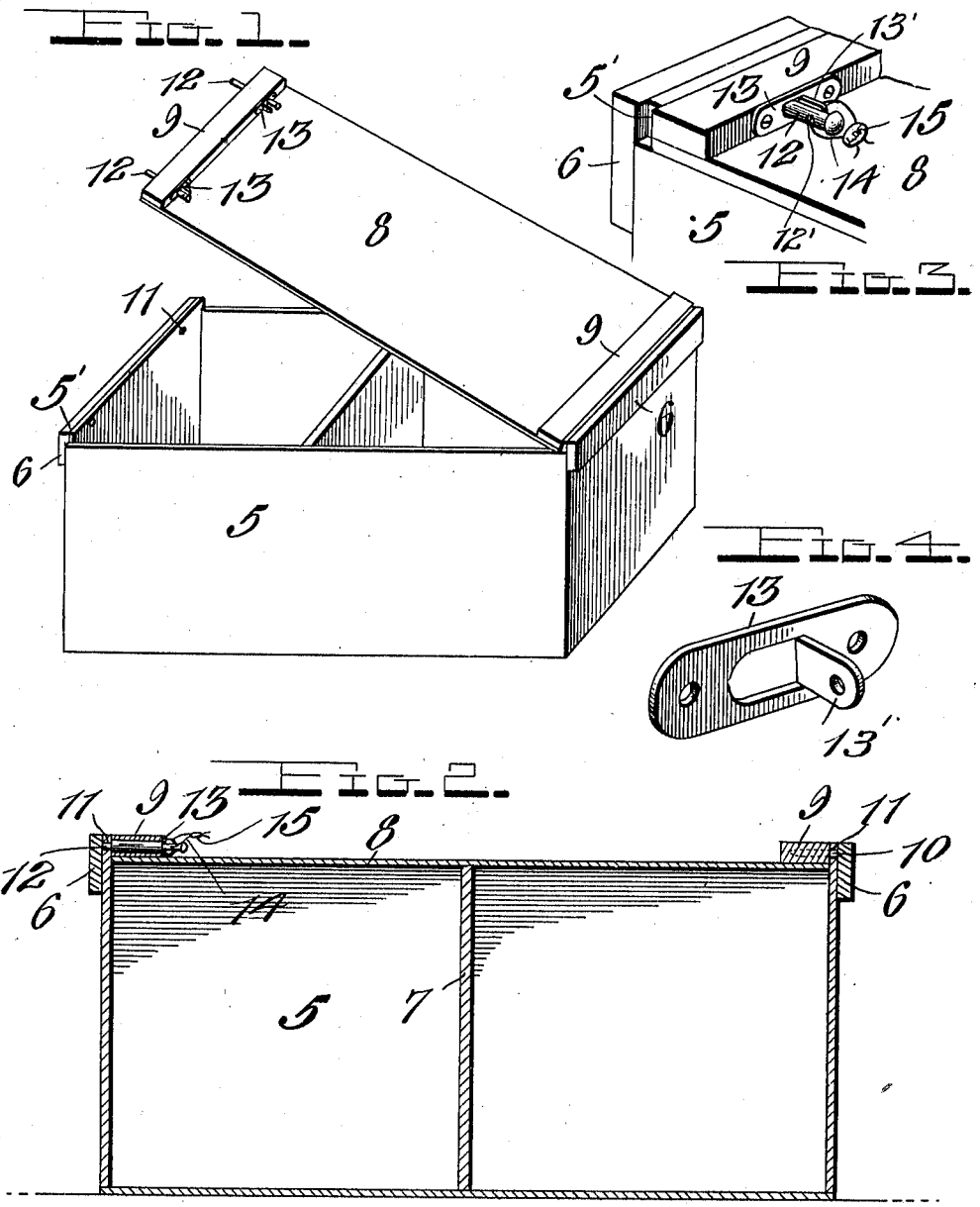

LOUIS D. FOX, OF STEPHENSPORT, KENTUCKY.

BOX-COVER FASTENER.

982,712.

Specification of Letters Patent.

Patented Jan. 24, 1911.

Application filed June 11, 1910. Serial No. 566,394.

*To all whom it may concern:*

Be it known that I, LOUIS D. Fox, a citizen of the United States, residing at Stephensport, in the county of Breckinridge and State of Kentucky, have invented certain new and useful Improvements in Box-Cover Fasteners, of which the following is a specification, reference being had to the accompanying drawings.

This invention relates to improvements in fasteners for boxes for securing the cover upon the box.

A still further object is to provide a box having a cover carrying spring bolts for engagement in sockets provided in the end of the box, suitable sealing means being employed to prevent retraction of the bolts whereby the box top may be lifted.

With these and other objects in view, the invention consists of the novel features of construction, combination and arrangement of parts hereinafter fully described and claimed, and illustrated in the accompanying drawings, in which—

Figure 1 is a perspective view of a box embodying my improvements, showing the lid or cover raised; Fig. 2 is a longitudinal section; and Fig. 3 is an enlarged detail perspective view of one corner of the box illustrating the means for sealing the locking bolts. Fig. 4 is a detail perspective view of a part.

Referring more particularly to the drawing 5 indicates a box which in the present instance is rectangular in form as clearly shown in Fig. 1, though it will be obvious that this box may be made in various shapes and sizes. Upon each end of the box and at the upper edge thereof a transverse cleat 6 is secured which greatly strengthens the box construction and also provides suitable handles by means of which the same may be lifted. The ends of the box as shown at 5' project slightly above the upper edges of the sides of the same. The upper longitudinal edges of the cleats 6 are in the same plane with the edges of the ends 5'.

If desired a central partition 7 may be fitted in the box to provide two separate compartments.

A cover 8 is adapted to be fitted between the projecting upper ends of the box and may be constructed of galvanized iron or other sheet metal or of the same material as the box body. This cover is adapted to rest upon the edges of the side of the box and has secured to its upper surface and at each end, a transverse cleat 9 which when the cover is in position upon the box as shown in Fig. 2 is disposed in the same plane with the ends of the box and the cleats 6. In one of the end cleats 9 carried by the cover the dowel pins 10 are secured. These pins project beyond the ends of the cover and adjacent to each of the longitudinal edges thereof. Each end of the case or box 5 is provided with the openings 11 therein. The openings in one of the box ends are adapted to receive the dowel pins 10 while the openings in the other end of the box receive the locking bolts 12 which are arranged in the cleat 9 secured to the other end of the cover 8.

The openings 11 and the dowel pins 10 and bolts 12 are disposed in the same longitudinal plane so that the cover may be reversed or turned end for end. The locking bolts 12 are of any usual or approved construction and the casings in which the springs are housed for holding the bolts in their locked positions are fitted into openings bored in the end cleat 9 carried by the cover. The bolts 12 extend beyond each of the longitudinal edges of the cleat, the inwardly extending ends of said bolts being adapted to be grasped to retract the same when the cover is being fitted upon the box. Upon releasing the bolts they are forced into the openings 11 in the end of the box thus securely holding the cover thereon.

In order to prevent the unauthorized opening of the box or case during transportation from one point to another, I provide means for sealing the cover thereon. To this end an opening 12' is formed in the inner end of each of the bolts 12. These bolts have their inner ends extended through openings in the plates 13 which are secured to the cleats carried by the cover of the box. An ear 13' is struck out from the plates and is perforated and when the bolts are in locking position these perforations are disposed in line with the openings in said bolts. Through these alined openings the sealing wire 14 is adapted to be passed and has its ends twisted or otherwise secured together. The usual lead seal 15 prevents the removal of the wire 14 from the openings thus holding the bolt in its locked position. The box cover 8 may be very quickly arranged on the box by first inserting the dowel pins 10 into the openings 11 and in one end thereof and then retracting the bolts 12 to allow the other end of the cover to be disposed within the opposite end of the box. The bolts are then released and sealed in locking position as above described.

From the foregoing it will be seen that I have provided a box or case of comparatively simple construction and one which is strong, durable and admirably adapted for the purpose set forth.

The device may also be manufactured at a very low cost and is of great convenience in the transportation of produce where a cheap and reliable shipping crate which may be easily and quickly sealed is of considerable importance.

The device may also be advantageously used for a large number of other purposes and is not restricted to the particular use above set forth.

The detail construction of the box or case is also susceptible of many minor modifications in form and proportion without departing from the essential feature or sacrificing any of the advantages of the same.

Having thus described the invention what is claimed is:—

The combination with a box body, a transverse cleat secured to the end of the body at its upper edge, the end of said body being provided with openings having their outer ends closed by said cleat, of a cover adapted to be fitted between the upper end portions of the ends of the box and disposed upon the sides thereof, a transverse cleat secured to the cover, spring bolts arranged in the cleat carried by the cover to engage in the openings in the end of said box, plates secured to the inner edge of said cleat, a laterally extending ear formed on each plate and extending in parallel relation to the bolt, said plate having an opening therein through which the bolt extends, said ear and bolt also having openings therein, said openings being alined when the bolt is in locking position to receive a suitable sealing wire to prevent retraction of the bolt.

In testimony whereof I hereunto affix my signature in the presence of two witnesses.

LOUIS D. FOX.

Witnesses:
 W. J. Schopp,
 R. A. Shellman.